Figure 1:
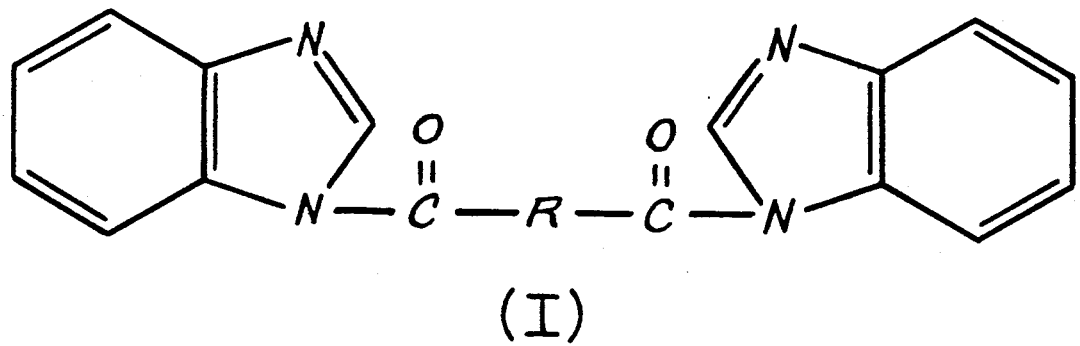

| United States Patent [19] | [11] Patent Number: 5,066,773 |
| Gibson et al. | [45] Date of Patent: Nov. 19, 1991 |

[54] FORMATION OF POLY(BENZIMIDAZOLE)

[75] Inventors: Harry W. Gibson; Yajnanarayana H. R. Jois, both of Blacksburg, Va.

[73] Assignee: Virginia Tech Intellectual Properties, Inc., Blacksburg, Va.

[21] Appl. No.: 418,313

[22] Filed: Oct. 6, 1989

[51] Int. Cl.$^5$ ............................................. C08G 73/18
[52] U.S. Cl. ...................................... 528/362; 528/26; 528/27; 528/28; 528/41; 528/363
[58] Field of Search .................... 528/362, 363, 26, 27, 528/28, 41, 271

[56] References Cited

U.S. PATENT DOCUMENTS 3,655,632  4/1972  Ohfuji et al. .......................... 528/362
3,708,439  1/1973  Sayigh et al. ......................... 528/363

Primary Examiner—Harold D. Anderson
Attorney, Agent, or Firm—Richard P. Fennelly; Louis A. Morris

[57] ABSTRACT

A poly Ressert can be formed by first reacting benzimidazole with an aliphatic diacid chloride to form bisbenzimidazole and then reacting the bisbenzimidazole with an aliphatic diacid chloride and cyanide to form the poly Reissert.

3 Claims, 1 Drawing Sheet

(I)

(II)

FORMATION OF POLY(BENZIMIDAZOLE)

BACKGROUND OF THE INVENTION

Recently, it has been proposed that Reissert compounds be synthesized to develop novel heterocyclic polymers for high performance applications (see H. W. Gibson et al., Amer. Chem. Soc., Polymer Preprints, 29(1), 154, 1988). Bis (Reissert compounds) have been synthesized in excellent yields by the use of a trimethylsilyl cyanide reagent and can be used to develop such polymers (see A. Pandya et al., Amer. Chem. Soc., Polymer Preprints, 30(1), 206, 1989). Several novel 4,4'-coupled bis-isoquinolines have also been synthesized (see H. W. Gibson et al., Amer. Chem. Soc., Polymer Preprints, 30(1), 208, 1989).

Polyheterocyclic polymers, in general, are known to have good thermal and physical properties. Thus, polyquinolines, polyquinoxalines, polybenzoxazoles, polybenzothiazoles, and polybenzimidazoles have been prepared as "rigid rod" systems with high thermal transition temperatures and good high temperature mechanical properties (see Encycl. Polymer Science and Engineering, Second Edition, Vol. 7, pp. 639-665) Polybenzimidazoles, however, demand special processing conditions because of low solubility The benzimidazole ring is formed in the polymerization process and the product polymer must be processed from the reaction mixture, typically polyphosphoric acid (see Encycl. of Polymer Science and Engineering, Second Edition, Vol. 11, pp. 572-601).

The instant process allows for a method for producing polymers by using benzimidazole itself as a monomer. The product polymers possess several advantageous features: (1) they are soluble; (2) they are chemically modifiable for the production of poly(keto/amides) and poly(ester/amides); and (3) copolymerization with polyamide and polyester monomers allows property enhancement of these materials by the presence of the benzimidazole nucleus.

DESCRIPTION OF THE INVENTION

The first step involves the reaction of benzimidazole with a diacid chloride to form a diamide, which is then reacted with diacid chloride and cyanide to form the poly Reissert compound.

Figure 2:
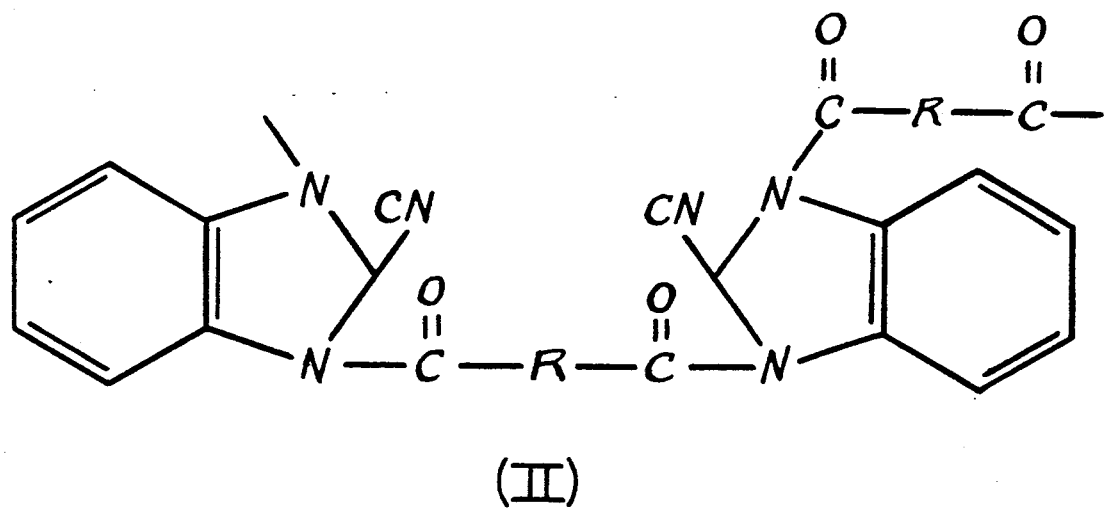

The first step in the instant process involves reaction of benzimidazole with an aliphatic diacid chloride of the general formula ClC(O)RC(O)Cl, where R is alkylene (e.g., $C_4$–$C_6$ alkylene) to yield a bisbenzimidazole of formula I as shown in accompanying FIG. 1. This reaction can be conveniently performed under the following general conditions: Organic solvent (e.g., dimethyl formamide), base (e.g., triethylamine), temperatures of about 5° C. to 20° C., and mechanical stirring The bisbenzimidazole compound (I) is then reacted with further aliphatic diacid chloride and cyanide (e.g., trimethylsilyl cyanide) to yield a poly Reissert having the repeating unit (II) as shown in FIG. 2. This reaction can be conducted in the same type of solvent used in the preceding step, at temperatures from 10° C. to 20° C. using amounts of the reagents which range from 1 to 1.2 on a molar ratio basis.

The following Examples further illustrate the present invention.

EXAMPLE 1

This shows synthesis of the type of compound shown as (I) in FIG. 2, specifically, bis(benzimidazoyl-1,6-dicarbonyl hexane.

To a well stirring solution of benzimidazole (0.022 mole, 2.6 gm) and triethylamine (0.011 mole, 0.11 gm) in dimethylformamide (10 ml), adipoyl chloride (0.01 mole, 1.83 gm) in dichloromethane (10 ml) was added. The resulting reaction media was stirred at room temperature for twenty-four hours. The reaction mixture was poured into water and was stirred for three hours. An essentially quantitative yield of the product was obtained by filtering the solid from the liquid mixture and was washed with water, ethanol (2 and 10 ml portions), ether (2 and 25 ml portions) and was dried. The crude product was taken up in hot dimethylformamide (35 ml) and was precipitated by pouring into water (250 ml), was filtered, was crystallized from tetrahydrofuran, and was dried. The yield was 3.2 gm (93%).

Melting point: 250°-252° C. (dec)

IR (KBr): 3150-2900 (C—H), 1721 (N—CO), 1680, 1677, 1610, 1507 (aromatic), 1477, 1451, 1419, 1387, 1348, 1335, 1309, 1284, 1235, 1204, and 1165 cm$^{-1}$.

$^1$HNMR (DMSO-d): delta 8.96 (s, 2H, $C_{21}$-H), 8.25-8.15 (m, 2H, Ar—H), 7.78-7.74 (m, 2H, Ar—H), 7.45-7.35 (m, 4H, Ar—H), 3.3-3.2 (s, 4H OCH$_2$) and 1.95-1.80 (s, 4H CH$_2$CH$_2$).

EXAMPLE 2

This shows synthesis of the type of compound shown in (II) in FIG. 2 from the compound of Example 1.

To a well stirring suspension of the compound from Example 1 (0.01 mole, 3.46 gm) in N-methyl pyrrolidone (35 ml) adipoyl chloride (0.01 mole, 1.83 gm) was added. The clear solution obtained after the addition of trimethylsilyl cyanide (0.022 mole, 5 ml) was stirred at room temperature for forty-four hours. The reaction mixture was quenched by pouring into water (600 ml). The precipitate obtained was treated with 8% aqueous HCl, saturated bicarbonate, 8% aqueous HCl, and then was washed with an excess of water, ethanol, ether, and was dried. The crude yield was 4.9 gm.

$^1$H NMR (DMSO-d$_6$) delta 8.3-6.7 (m, 5H, Ar—H), 3.2-2.2 (m, 4H, OCH$_2$), 2.0-1.4 (m, 4H, CH$_2$)CH$_2$).

We claim:

1. A process for forming a polymer which comprises:
   (a) reaction of benzimidazole with an aliphatic diacid chloride to form bisbenzimidazole of the formula

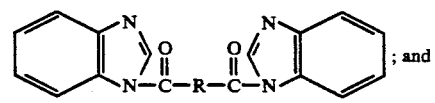

; and (b) reaction of the bisbenzimidazole with an aliphatic diacid chloride and cyanide to form the polymer having the repeating unit

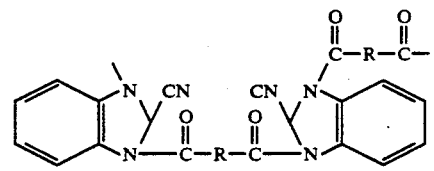

where R is alkylene.
2. A process as claimed in claim 1 wherein the diacid chloride is adipoyl chloride.
3. A polymer having the repeating unit:
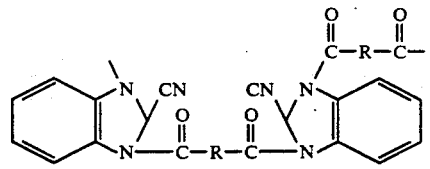
where R is alkylene.
* * * * *